(12) United States Patent
Ditto et al.

(10) Patent No.: US 9,064,091 B2
(45) Date of Patent: Jun. 23, 2015

(54) COUPLED DYNAMICAL SYSTEMS FOR CHAOS COMPUTING

(71) Applicants: William Ditto, Kaneohe, HI (US); Behnam Kia, Honolulu, HI (US); Sarvenaz Kia, Tabriz (IR)

(72) Inventors: William Ditto, Kaneohe, HI (US); Behnam Kia, Honolulu, HI (US); Sarvenaz Kia, Tabriz (IR)

(73) Assignee: University of Hawaii, Honolulu, HI (US)

( * ) Notice: Subject to any disclaimer, the term of this patent is extended or adjusted under 35 U.S.C. 154(b) by 0 days.

(21) Appl. No.: 14/222,218

(22) Filed: Mar. 21, 2014

(65) Prior Publication Data
US 2014/0359256 A1 Dec. 4, 2014

Related U.S. Application Data

(60) Provisional application No. 61/804,048, filed on Mar. 21, 2013.

(51) Int. Cl.
*H03K 19/173* (2006.01)
*G06F 15/76* (2006.01)
*H04L 9/00* (2006.01)
*H03K 19/20* (2006.01)

(52) U.S. Cl.
CPC .............. *G06F 15/76* (2013.01); *H04L 9/001* (2013.01); *H03K 19/1733* (2013.01); *H03K 19/20* (2013.01)

(58) Field of Classification Search
CPC .............. H04L 9/001; H04L 2209/046; H04L 2209/12; H04L 9/003; H04L 9/12; H04L 2209/30; H04L 9/0861; H04L 9/3013; H04L 9/302; H04L 9/3093; H04L 2209/603; H03K 19/0013; H03K 19/0944; H03K 19/17704; H03K 19/17728; H03K 19/17768; H03K 19/20; H03K 19/173; H03K 19/1733; H03K 3/037

See application file for complete search history.

(56) References Cited

U.S. PATENT DOCUMENTS

| | | | |
|---|---|---|---|
| 6,064,701 A * | 5/2000 | Tresser et al. ................. 375/285 |
| 7,863,937 B2 * | 1/2011 | Ditto et al. .................... 326/104 |
| 7,924,059 B2 * | 4/2011 | Ditto et al. .................... 326/104 |
| 7,973,566 B2 * | 7/2011 | Ditto et al. .................... 326/104 |
| 2014/0074761 A1 * | 3/2014 | Hunzinger ...................... 706/15 |

* cited by examiner

*Primary Examiner* — Jany Richardson

(57) ABSTRACT

The present invention provides systems and methods for coupled dynamical systems for chaos computing. For example, a system for the coupled dynamical system comprises a first, second, and third circuit. The first circuit comprising a plurality of single dynamical systems forms a coupled dynamical system that reduces local noises in the plurality of single dynamical systems by diffusing the local noises across the coupled dynamical system. The second circuit, connected to the first circuit, receives the data and control inputs and builds an encoding map that translates the data and control inputs to an initial condition on an unstable manifold of the plurality of single dynamical systems in the coupled dynamical system. After the coupled dynamical system evolves, a third circuit, connected to the first circuit, samples a state of one of the plurality of single dynamical systems in the coupled dynamical system and builds a decoding map.

27 Claims, 12 Drawing Sheets

COUPLED DYNAMICAL SYSTEMS FOR CHAOS COMPUTING

CROSS REFERENCE TO RELATED APPLICATION

This application claims benefit of U.S. Provisional Application No. 61/804,048 filed Mar. 21, 2013. The contents of that application are hereby incorporated by reference herein.

GOVERNMENT RIGHTS

The subject matter disclosed herein was made with government support under grant number N00014-12-1-0026 awarded by the Office of Naval Research. The Government has certain rights in the herein disclosed subject matter.

TECHNICAL FIELD

The disclosed inventions are generally in the field of chaos computing. The disclosed inventions are also in the field of coupled dynamical systems.

BACKGROUND

As transistors become smaller they switch faster, dissipate less power, and are cheaper to manufacture on a per unit basis. These advances have led to increased performance of digital computers. Studies show that average feature size has reduced by about 30% every two or three years. However, there are practical difficulties in continuing to reduce transistor size at this rate, and physical limits are already being reached. As transistors become smaller, signal integrity and noise issues increase and become a limiting factor for the manufacture of deep submicron digital integrated circuits. This phenomenon arises because as transistors become smaller, signal and voltage levels decrease, however the amount of noise in the system is fixed. Thus, signal to noise ratios have also been shrinking, which deteriorates the overall practicality of even-smaller circuits. Accordingly, there is a need for computing systems that are more robust to the presence of noise. The inventions disclosed herein are directed to these and other important needs.

SUMMARY

Provided herein are systems for a coupled dynamical system for chaos computing, comprising a first circuit comprising a plurality of single dynamical systems to form a coupled dynamical system that reduces local noises in the plurality of single dynamical systems by diffusing the local noises across the coupled dynamical system; a second circuit, operatively coupled to the first circuit, that receives data inputs and control inputs and builds an encoding map, the encoding map translating the data and control inputs to an initial condition on an unstable manifold of the plurality of single dynamical systems in the coupled dynamical system; and a third circuit, operatively coupled to the first circuit, that builds a decoding map and samples a state of one of the plurality of single dynamical systems in the coupled dynamical system after the coupled dynamical system evolves for a fixed time.

Also provided are methods for fabricating a coupled dynamical system for chaos computing. The disclosed methods comprise fabricating a first circuit comprising a plurality of single dynamical systems to form a coupled dynamical system that reduces local noises in the plurality of single dynamical systems by diffusing the local noises across the coupled dynamical system; fabricating a second circuit, operatively coupled to the first circuit, that receives data inputs and control inputs and builds an encoding map, the encoding map translating the data and control inputs to an initial condition on an unstable manifold of the plurality of single dynamical systems in the coupled dynamical system; and fabricating a third circuit, operatively coupled to the first circuit, that builds a decoding map and samples a state of one of the plurality of single dynamical systems in the coupled dynamical system after the couple dynamical system evolves for a fixed time.

Also provided are methods for operating a coupled dynamical system for chaos computing, comprising: diffusing local noises across a coupled dynamical system, the coupled dynamical system comprising a first circuit comprising a plurality of single dynamical systems that reduces local noises in the plurality of single dynamical systems; operatively coupling a second circuit to the first circuit, the second circuit receiving at least one input to build an encoding map, the encoding map translating the at least one input to at least one parameter on an unstable manifold of the plurality of single dynamical systems in the coupled dynamical system; and operatively coupling a third circuit to the first circuit, the third circuit building a decoding map and sampling a state of one of the plurality of single dynamical systems in the coupled dynamical system after the coupled dynamical system evolves for a fixed time.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The summary, as well as the following detailed description, is further understood when read in conjunction with the appended drawings. For the purpose of illustrating the invention, there are shown in the drawings exemplary embodiments of the invention; however, the invention is not limited to the specific methods, compositions, and devices disclosed. In addition, the drawings are not necessarily drawn to scale. In the drawings.

DETAILED DESCRIPTION OF ILLUSTRATIVE EMBODIMENTS

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any subcombination. Further, references to values stated in ranges include each and every value within that range.

"Dynamical system," as used herein, is defined as a system described by a set of equations that gives the time evolution of the state from an initial state. These equations present the continuous-time evolution of the system:

$$\dot{x} = F(x)$$

where x is a state vector of the system; or the equations can be discrete, presenting the discrete-time evolution of the system:

$$x_{n+1} = F(x_n)$$

where $x_k$ represents the state of the system at time step k. The sequence of states, starting from an initial condition $x_0$ traces an orbit in the state vector space of the system. As used herein, the term "dynamical system" and "dynamic system" are used interchangeably and also indicate the system described above.

A coupled dynamical system for chaos computing can provide noise robustness in computation by coupling identical dynamical systems. For example, N identical dynamical systems dynamically couple them together and form a coupled dynamical system composed of N single dynamical systems. The result of this coupled dynamical system is more robust to noise than each of the individual dynamical system when they operate isolated. Therefore, this coupled dynamical system can implement more robust to noise computation than a single, isolated dynamical system can implement.

Figure 1:
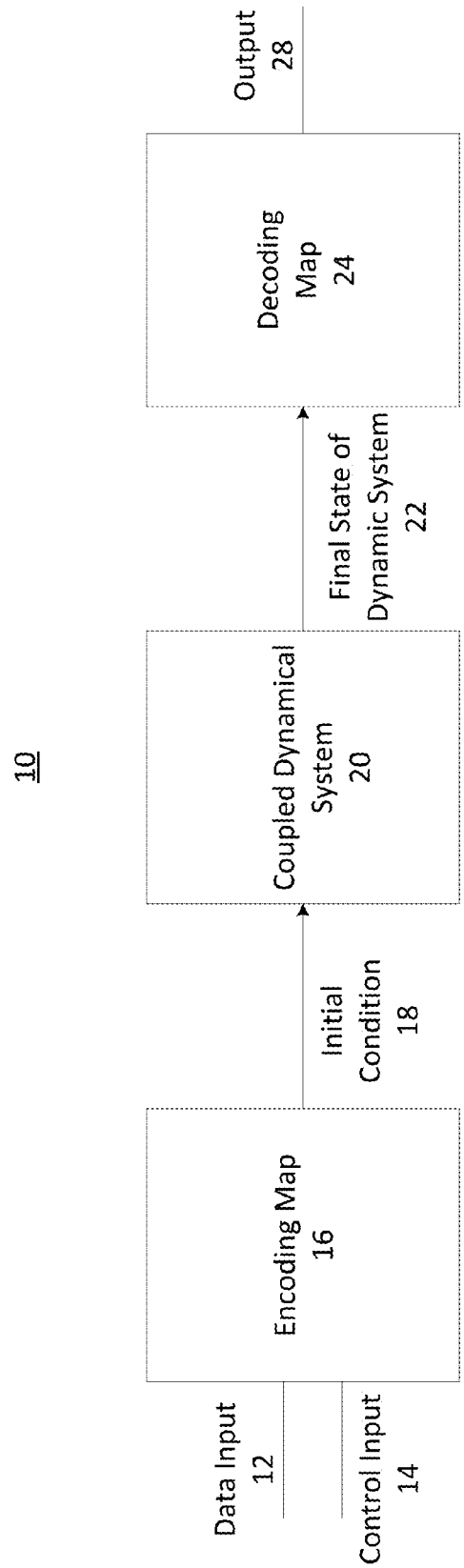
FIG. 1 is a system diagram illustrating a coupled dynamical system for chaos computing in accordance with an embodiment.

FIG. 1 provides a system diagram illustrating a coupled dynamical system for chaos computing in accordance with an embodiment of the present invention. The system 10 can comprise a first circuit, a second circuit, and a third circuit. The first circuit can include a plurality of single dynamical systems to form the coupled dynamical system 20. The coupled dynamical system 20 can reduce local noises in the plurality of single dynamical systems by diffusing the local noises across the coupled dynamical system 20, or attenuating each other's effects, or both. The first circuit forming the coupled dynamical system 20 can be implemented using resistors, capacitors, inductors, transistors, and the like.

The second circuit, connected to the first circuit, can receive data inputs 12 and control inputs 14 and build an encoding map 16 that translates the data inputs 12 and control inputs 14 to an initial condition 18 on unstable manifold of the plurality of single dynamical system in the coupled dynamical system 20. The second circuit can be an implementation of the encoding map 16 using resistors, capacitors, inductors, transistors, or any combination thereof. The third circuit, connected to the first circuit, can build a decoding map 24. After the coupled dynamical system 20 evolves for a fixed time, the third circuit can sample the final state of one of the plurality of single dynamical systems 22 in the coupled dynamical system 20. The third circuit can be an implementation of the decoding map 24 using resistors, capacitors, inductors, transistors, or any combination thereof.

The first, second, and third circuits described herein can be implemented using discrete electronic elements such as resistors, capacitors, inductors, or the like. Moreover, the first, second, and third circuits can be implemented using integrated circuits such as transistors. Further details of embodiments for the circuits are described in FIGS. 7-12 in the instant application.

The coupled dynamical system 20 can be represented by a coupled map lattice as a subgroup of the coupled dynamical system 20. The coupled map lattice can have a plurality of nodes that is indicative of additive noise in each of the plurality of single dynamical systems. After the coupled map lattice evolves for a fixed time, a final state of one of the plurality of nodes can be selected and sampled to read the final output.

Arrangements of the plurality of single dynamical systems in the coupled dynamical system 20 can comprise a point-topoint topology, a star topology, a ring topology, a tree topology, a line topology, a mesh topology, a fully connected topology, and the like. The point-to-point topology has a permanent link between two single dynamical systems. With the star topology, each of the single dynamical system is connected to a central hub single dynamical system with a point-to-point connection. The ring topology is set up in a circular fashion in which each single dynamical system is connected to its left and right neighbors. A fully connected mesh topology is a network in which each of the single dynamical systems is connected to each other. A partially connected mesh topology is a network in which some of the single dynamical systems are connected to more than one other single dynamical system with a point-to-point link. The tree topology is based on a hierarchy of the single dynamical systems. The highest level of any single dynamical system consists of a root node; this node can connected a single node in the level below by point-to-point links. These lower level nodes can also be connected to a single or multiple nodes in the next level down. The coupled dynamical system 20 can have any type of topologies, which are not limited to the specific topologies listed above.

Each of the single dynamical systems can be subject to the local noises. This means that the noise terms added to a single dynamical system are independent from noise terms added to the other single dynamical systems in the coupled dynamical system 20. Each of the single dynamical systems can receive the same control inputs, therefore their initial conditions are being shifted for the same amount. These programming inputs are coherent changes across the coupled dynamical system 20, whereas the noise is incoherent and statistically independent. The result is that the coupled dynamical system 20 keeps the coherent changes, but the independent noise terms diffuses across the coupled dynamical system 20, or attenuates each other's effect, or both. This process is a combination of diffusion plus averaging, which are achieved through coupling.

The local noises in the plurality of single dynamical systems can comprise additive noise, multiplicative noise, quantization error noise, Poisson noise, shot noise, transient noise, burst noise, phase noise, or the like. The additive noise refers to the noise added to the intended signal and can include one or more of the following: white noise, additive white Gaussian noise, pink noise, black noise, Gaussian noise, flicker noise, Brown noise, contaminated Gaussian noise, power-law noise, and Cauchy noise. Multiplicative noise refers to an unwanted random signal that gets multiplied into some relevant signal during capture, transmission, or other processing. Quantization error refers to noise caused by conversion from continuous to discrete values. Poisson noise refers to the fluctuations that are observed in a Poisson process. More specifically, the number of observed occurrences fluctuates about its mean with a standard deviation in Poisson distribution. Shot noise refers to a type of electronic noise which originates from the discrete nature of electric charge. Transient noise refers to a short pulse followed by decaying oscillations. Burst noise refers to a type of electronic noise that occurs in semiconductors, Phase noise refers to the frequency domain representation of rapid, short-term, random fluctuations in the phase of a waveform, caused by time domain instabilities. Local noises in the plurality of single dynamical systems can include any type of noises in signal processing, and are not limited to the specific types of noise listed herein.

In another embodiment, the coupled dynamical system 20 can be initialized based on the encoding map 16 to an initial condition 18. For example, the encoding map 16 receives data inputs 12 and control inputs 14 and translates the data inputs 12 and control inputs 14 to an initial condition on an unstable manifold of the plurality of single dynamical systems in the coupled dynamical system 20. In addition, utilizing the encoding map 16, the coupled dynamical system 20 can perform desired computations by programming different inputs. For example, the encoding map 20 receives data inputs 12 and control inputs 14 and translates the data inputs 12 and control inputs 14 to a parameter or parameters of the plurality of single dynamical systems in the coupled dynamical system 20.

Noise robustness of the coupled dynamical system 20 can increase as the size of the coupled dynamical system 20 increases. For example, the maximum noise intensity that a coupled dynamical system 20 of size three can tolerate and still perform computation is about $\sqrt{3}$ times more than the maximum noise intensity that an individual, isolated dynamical system can tolerate and perform computation with the same error rate. Furthermore, the maximum noise intensity that a coupled dynamical system 20 of size N can tolerate and still can perform computation can be about $\sqrt{N}$ times more than the noise intensity that a single dynamical system can tolerate and perform computation with the same error rate. Thus, coupling dynamical systems is a systematic way to build more robust to noise computing systems.

The evolution of the coupled dynamical system 20 can play a role in mapping different states. This means that the coupled dynamical system 20 can map an initial state to future states after the evolution. This mapping can also be used to implement computation. If the coupled dynamical system 20 is continuous, the coupled dynamical system 20 typically evolves for a fixed time. However, if the coupled dynamical system 20 is discrete, the coupled dynamical system 20 typically evolves for a fixed iteration.

After the coupled dynamical system 20 evolves for a fixed time, the coupled dynamical system 20 can stop working and the final state of one of the plurality of single dynamical systems 22 at the end of the evolution time can be sampled at the third circuit. Then, the third circuit generates an output of computation 28 based on the decoding map 24.

The output of computation 28 can vary with changes of the control inputs 14. More specifically, the encoding map 24 can map different sets of the inputs to different points on the unstable manifold of the plurality of single dynamical systems in the coupled dynamical system 20, and these points are used as initial conditions 18 for the coupled dynamical system 20. Thus, the orbits of the coupled dynamical system 20 are very sensitive to the inputs, and the orbits can dramatically change with just a one-bit change in the control input 14. This means that control inputs 14 can select a dynamical (or chaotic) logic function.

Figure 2:
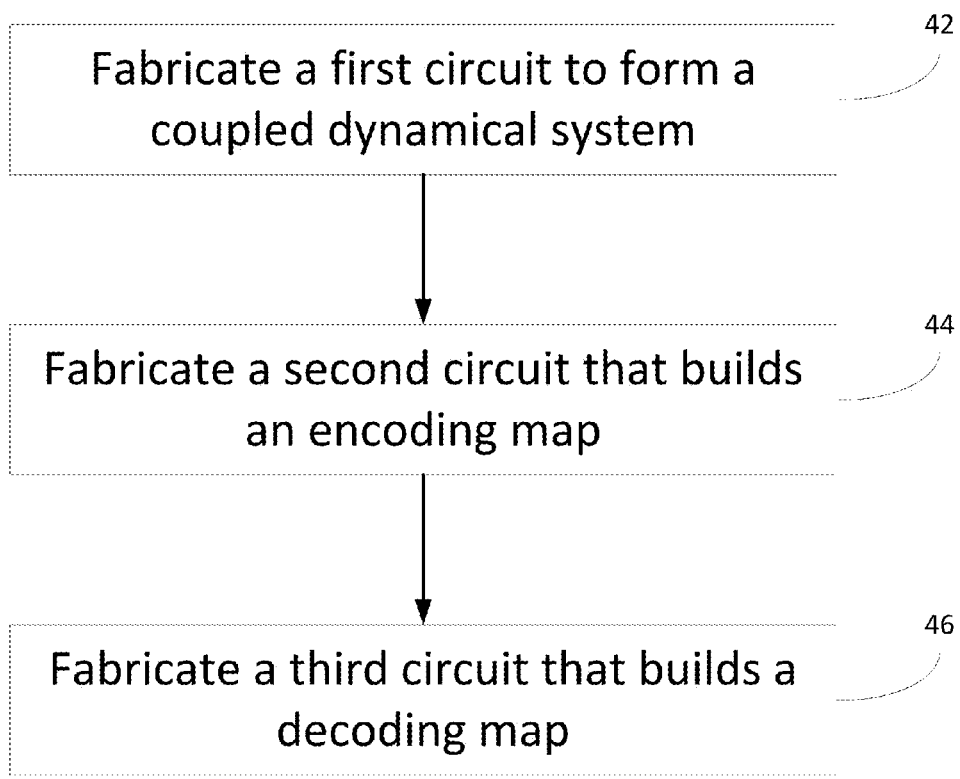
FIG. 2 is a flow diagram illustrating a process for a coupled dynamical system for chaos computing in accordance with an embodiment.

FIG. 2 illustrates a process for a coupled dynamical system for chaos computing in accordance with an embodiment of the present invention. For example, at step 42, a first circuit is fabricated by comprising a plurality of single dynamical systems, thereby forming a coupled dynamical system. The coupled dynamical system can be implemented using resistors, capacitors, inductors, transistors, or the like. The coupled dynamical system can reduce local noises in the single dynamical systems through coupling redundant dynamical systems. In other words, the local noises in each of the single dynamical systems can be averaged out over the coupled dynamical system. Thus, the coupled dynamical system can produce a new dynamical system that is more robust to noise than each isolated, individual dynamical system.

At step 44, a second circuit, connected to the first circuit, can be fabricated to build an encoding map and receive data inputs and control inputs. The second circuit can be an implementation of the encoding map using resistors, capacitors, inductors, transistors, or any combination thereof. Based on the encoding map, the coupled dynamical system can be initialized to an initial condition. For example, the encoding map translates the data and control inputs to one initial condition on the unstable manifold of the single dynamical systems in the coupled dynamical system. Each of the single dynamical systems can receive the same inputs and they can collaborate through coupling to implement a more robust function. Each of the single dynamical systems can also have the same unstable manifold. Coupling the single dynamical systems into the coupled dynamical system does not alter the dynamics and/or unstable manifolds of the dynamical systems. Thus, the coupled dynamical system can have its own unstable manifold of the dynamical system.

At step 46, a third circuit, connected to the first circuit, can be fabricated to build a decoding map and sample a final state of one of the single dynamical systems. Similar to the second circuit, the third circuit can be an implementation of the decoding map using resistors, capacitors, inductors, transistors, or any combination thereof. The final state of one of the single dynamical systems in the coupled dynamical system can be selected and sampled to read final output after the coupled dynamical system evolves for a fixed time. If the coupled dynamical system is continuous, the coupled dynamical system evolves for a fixed time. If the coupled dynamical system is discrete, the coupled dynamical system evolves for a fixed iteration. Since each of the single dynamical systems in the coupled dynamical system is symmetric and has the same level of noise robustness, the final state of any of the single dynamical systems can be selected and sampled to read final output. The final output of computation generated based on the decoding map, can vary with changes on control inputs.

As described above, the arrangements of the single dynamical systems in the coupled dynamical system can comprise a point-to-point topology, a star topology, a ring topology, a tree topology, a line topology, a mesh topology, a fully connected topology, or the like. The coupled dynamical system can have any type of arrangement, giving rise to noise robustness. For example, a simpler coupling such as a ring where each of single dynamical system is connected to its left and right neighbors can result in a comparable amount of noise robustness. The coupled dynamical system can perform desired computations through programming different inputs. Each of the single dynamical systems can be chained together as the coupled dynamical system and the coupled dynamical system does the computation. Each of the single dynamical systems can share the information with other single dynamical systems, and as a result, and because of distribution of information and information processing among different single dynamical systems, the architecture of this coupled dynamical system can be more reliable than a single dynamical system for chaos computing. For example, the encoding map receives data inputs and control inputs and translates the data and control inputs to an initial condition on an unstable manifold of the plurality of single dynamical systems in the coupled dynamical system or to a parameter or parameters of the plurality of single dynamical systems in the coupled dynamical system.

The data inputs can comprise m digital data inputs such as $X^1_{Data}, X^2_{Data}, \ldots X^m_{Data}$. The control inputs can comprise n digital control inputs such as $X^1_{Control}, X^2_{Control}, \ldots X^n_{Control}$. Computation using the coupled dynamical system can consist of three steps:

Step 1: Each set of data inputs and control inputs can be mapped to one initial condition on the unstable manifold of the coupled dynamical system based on the encoding map. The coupled dynamical system can be initialized to the same initial condition. For example, let T map (or encode) the m data and n control inputs onto the space of the initial conditions. If L is a binary set $\{0,1\}$, then $L^{(n+m)}$ represents the domain of T, which consists of all the possible combinations of digital data and control inputs. Let β be the unstable manifold of the coupled dynamical system, $R^s$ the general state space of the dynamical system, and Y the output of the encoding map on the unstable manifold. In this example, the general form of the encoding map 24, T, can be as follows:

$$T:L^{(n+m)} \to \beta, \beta \subset {}^s, L=\{0,1\}$$

$$Y=T(X_{Data}^1, X_{Data}^2, \ldots, X_{Data}^m, X_{Control}^1, Control^2, \ldots, X_{Control}^n)$$

Step 2: Starting from the initial conditions produced by the encoding map, the coupled dynamical system can evolve for a fixed time. If the coupled dynamical system is discrete, the coupled dynamical system evolves for a fixed iteration number.

Step 3: After the evolution time, the coupled dynamical system can stop working and the final state of one of the single dynamical system at the end of the evolution time can be sampled and decoded to the outputs based on the decoding map.

The encoding map can map different sets of the inputs to different points on the unstable manifold of the coupled dynamical system, and these points are used as initial conditions for the coupled dynamical system. Since the coupled dynamical system is on the unstable manifold, the orbits of the coupled dynamical system are very sensitive to the inputs, and the orbits can dramatically change with just a one-bit change in the control input. Thus control inputs can select a dynamical (or chaotic) logic function. To evaluate which digital function is selected with a particular control input, the association of a control input with a logic function can be noted and all possible combinations of data inputs can be enumerated to construct the truth table of the function.

By changing the control input, and repeating this procedure of constructing the truth table of the digital function, a second digital function different (with high probability) from the first one can be observed. This can mean the reconfigurability of chaos computing system. By using all possible control inputs and finding the type of function that the coupled dynamical system can implement, the full instruction set of the coupled dynamical system can be obtained.

Figure 3:
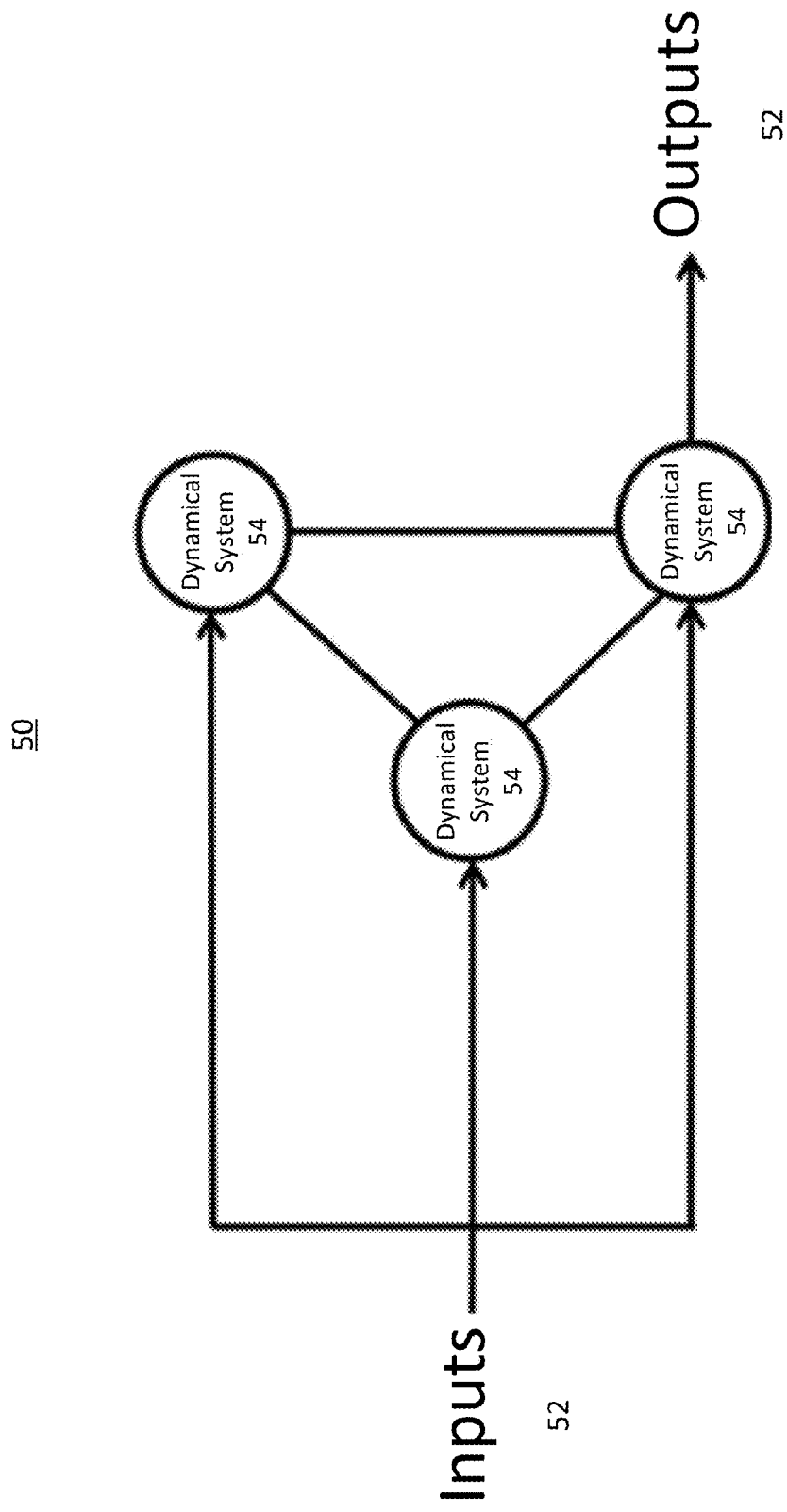
FIG. 3 is system diagram illustrating a coupled dynamical system with a ring architecture, in accordance with an embodiment.

FIG. 3 illustrates a coupled dynamical system 50 with ring architecture in accordance with an embodiment of the present invention. The coupled dynamical system 50 is composed of three elements, the dynamical systems 54. The dynamics of all three elements are the same and each of them is modeled by a one-dimensional discrete dynamic function ƒ. The three dynamical systems 54 are coupled altogether with coupling parameter of 6. The same inputs 52 (i.e. data and control values) are given to all three dynamical systems 54, and the three dynamical systems 54 are set to the same initial condition based on the inputs 52. In this coupled dynamical system 50, it is assumed that the inputs 52 (i.e. data and control values) are mapped to an initial condition x0. This is the initial condition of all three dynamical systems 54. It is further assumed that the noise is additive, and the noise distribution for all three dynamical systems 54 is the same, but each dynamical system 54 is affected statistically independent from each other.

The coupling scheme of the coupled dynamical system 50 shown in FIG. 3 is as follows:

$$x_j(i+1) = (1-\varepsilon)f(x_j(i)) + \frac{\varepsilon}{2}[f(x_{j-1}(i)) + f(x_{j+1}(i))] \quad (1)$$

where $x_j$, j=1, 2, 3, represents the state of the jth node, $f$ is a one-dimensional, discrete chaotic map, $\varepsilon$ is the coupling parameter, and $\varepsilon \in [0,1]$. Since the topology of the coupled dynamical system 50 is a ring, the first and the last map of the coupled dynamical system 50, i.e. j=1 and j=3, are connected to each other. The output of the computation can be decoded from the output of one of the dynamical systems 54, for example, the node with index one.

It is also assumed that all maps in the coupled dynamical system 50 can be perturbed by additive white Gaussian noise. The noise effects to the jth map are as follows:

$$x_j(i) + D\delta_j(i), j=1,2,3 \quad (2)$$

where $\delta_j \sim N(0,1)$ normal Gaussian noise and D is noise intensity to scale the noise added to the map. For example, the state of the maps at time i can be $x_j(i)+D\delta_j(i)$, where, and noise term $\delta_j(i)$ is independent and identically distributed over both i and j indexes. It means that the noise terms in all maps can have the same distribution, but they are statistically independent.

It is also assumed that the initial condition of the coupled dynamical system 50 is:

$$x_1(0)+D\delta_1(0), x_2(0)+D\delta_2(0), x_3(0)+D\delta_3(0)$$

Since the initial condition of all maps is set to the same value, e.g. x(0), based on the data and the control inputs, the next state of map j under chaotic evolution of the coupled dynamical system 50, formulated in Equation (1) can be:

$$x_j(1) = (1-\varepsilon)f(x(0) + D\delta_j(0)) + \quad (3)$$
$$\frac{\varepsilon}{2}[f(x(0) + D\delta_{j-1}(0)) + f(x(0) + D\delta_{j+1}(0))] + D\delta_j(1)$$

After linearizing the function f around initial condition x(0), it is obtained:

$$x_j(1) = \quad (4)$$
$$f(x(0)) + Df'(x(0))\left[(1-\varepsilon)\delta_j(0) + \frac{\varepsilon}{2}\delta_{j-1}(0) + \frac{\varepsilon}{2}\delta_{j+1}(0)\right] + D\delta_j(1)$$

It is observed that the next state of the map is composed of three main terms; the first one, $f(x(0))$, is the noise free evolution of the map from the exact initial condition, x(0); the second term, $$Df'(x(0))\left[(1-\varepsilon)\delta_j(0) + \frac{\varepsilon}{2}\delta_{j-1}(0) + \frac{\varepsilon}{2}\delta_{j+1}(0)\right],$$

is evolution of the noise added to the coupled dynamical system 50 at the previous step; and the third and the last term is the additive noise at the current step, $D\delta_j(1)$.

The time evolution of a single dynamic map can be obtained by setting $\varepsilon=0$ in Equation (4) and the result is:

$$x(1)=f(x(0))+Df'(x(0))\delta(0)+D\delta(1) \quad (5)$$

The main difference between Equations (5) and (6) can be in the evolution of noise effects. In a single dynamical system, the local noise term evolves, whereas in a coupled dynamical system, a summation of noise terms from the local map and the close-by maps evolve. Based on the assumption, the noise terms added to different maps are independent and identically distributed. Therefore by using the law of summation of independent random variables, the distribution of evolution of noise in the coupled dynamical system can be computed as follows:

$$Df'(x(0))\left[(1-\varepsilon)\delta_j(0) + \frac{\varepsilon}{2}\delta_{j-1}(0) + \frac{\varepsilon}{2}\delta_{j+1}(0)\right] \approx \quad (6)$$
$$N\left(0, [Df'(x(0))]^2\left[(1-\varepsilon)^2 + \frac{\varepsilon^2}{2}\right]\mathrm{var}(\delta(0))\right) =$$
$$N\left(0, [Df'(x(0))]^2\left[(1-\varepsilon)^2 + \frac{\varepsilon^2}{2}\right]\right)$$

where $\mathrm{var}(\delta(0))$ is the variance of all identically distributed normal Gaussian noise which is 1. Now the variance of evolution of noise after one iteration of the map for a single uncoupled map can be computed by simply setting $\varepsilon=0$ in Equation (6) and the result is:

$$N(0,(Df'(x(0))^2\delta(0)))=N(0,[Df'(x(0))]^2) \quad (7)$$

Figure 4:
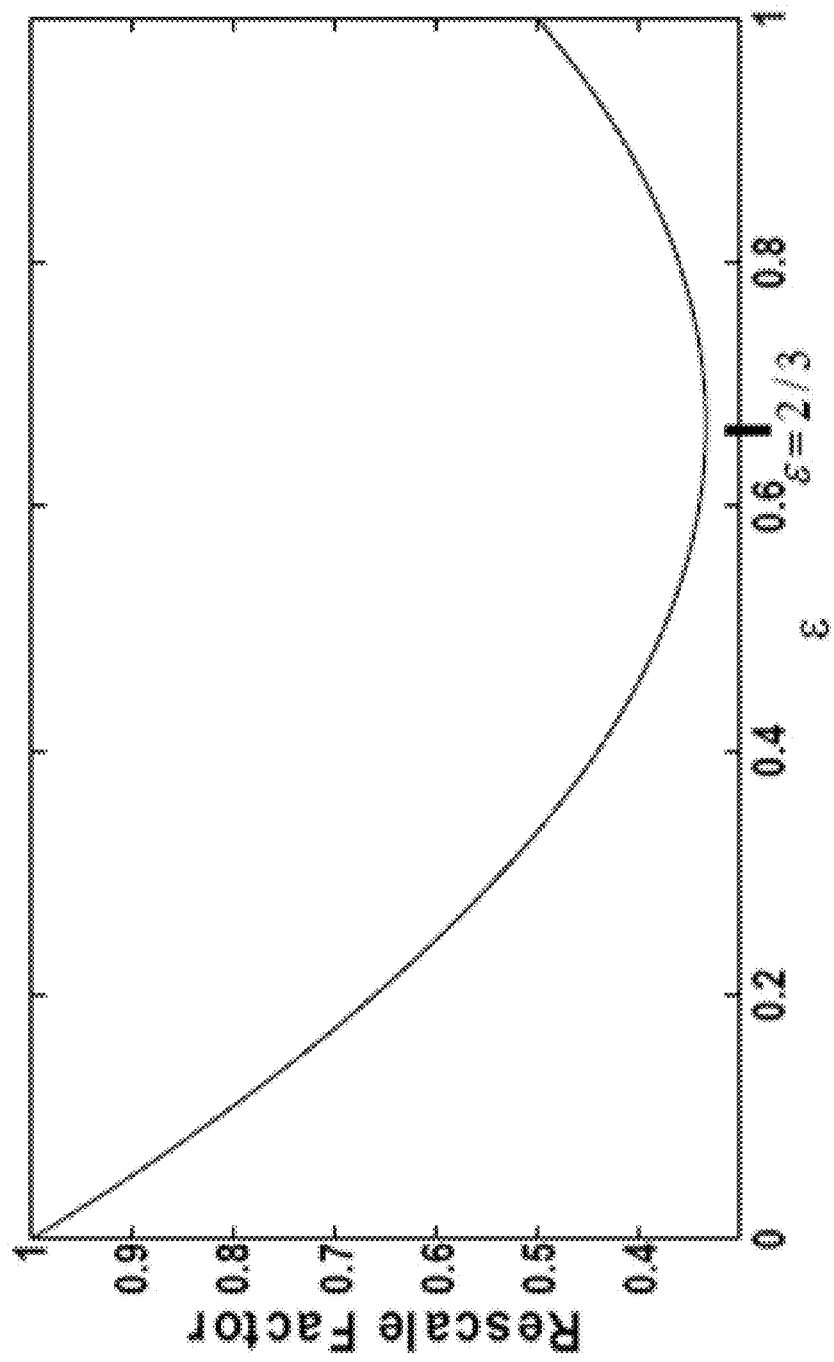
FIG. 4 is a graph illustrating resealing factor versus different values of coupling parameter $\epsilon$ in accordance with an embodiment.

By comparing Equations (7) and (8), the variance of evolution of noise in the coupled dynamical system 50 can be resealed by $$\left[(1-\varepsilon)^2 + \frac{\varepsilon^2}{2}\right],$$

where $\varepsilon \in [0,1]$. FIG. 4 illustrates this resealing factor that is plotted for different possible values of coupling parameters.

Referring back to FIG. 2, the rescale factor is always less than 1, meaning that by introducing this resealing factor into the equation, the variance of noise effects can shrink. Furthermore, by taking first derivate of this resealing factor and setting it to zero, $\varepsilon=2/3$ is founded as the optimal coupling parameter that can result in maximum amount of noise effect reduction scale, 1/3.

The additive noise around the initial condition can be considered as a noise cloud. However, it is uncertain that where exactly the noisy initial condition is; it can be anywhere in the noise cloud. Although the exact location of the noisy initial condition is uncertain, a probability distribution can be determined. The probability distribution can give the probability that the noisy initial condition can be at each region of the cloud. After each iteration of the map, this cloud of noise can be resealed and reshaped based on eigenvectors and eigenvalues of the map. In a dynamic map, this kind of uncertainty, growth under the map, although at some specific locations of the attractor, the eigenvalues can be less than 1. However, in average, the cloud size can grow over time because the dynamic map has a positive Lyuponov exponent, which represents the average of eigenvalues. In chaos computing, to decode the output of the computation from the state of the dynamical system, the state space of the dynamical system can be divided into two partitions, and labeled each partition as 0 and 1. The error in computation can happen, if the noise effects can move an orbit from state 0 to 1, or vice versa. Therefore, the evolved cloud of noise under the dynamic map may need to be kept far from the partition boundaries. If the noise cloud crosses the partition boundary, it may mean that there is a possibility that noise can disrupt the computation.

By comparing Equations (4) and (5), the noise-free evolution of coupled dynamical system for chaos computing and the single dynamical system for chaos computing, are the same. The main difference is in evolution of noise effects. In the coupled dynamical system for chaos computing, the variance of the noise effects, which determines the size of the evolved cloud of noise, can be resealed and shrunk down to ⅓ of the variance of noise effects in a single dynamical system for chaos computing. This effect enables the coupled dynamical system for chaos computing to tolerate noise intensities of up to $\sqrt{3}$ times size of the noise intensity that a similar single dynamical system for chaos computing can tolerate. It is noticed that noise intensity D, appears as $D^2$ in equation of noise variance, is why resealing factor for noise intensity is $\sqrt{3}$.

As described above, the evolution of the additive noise after one iteration of the dynamic map has been modeled. The same modeling can be used to demonstrate this resealing rule on further iterations of the map, when the coupling parameter is set to the optimal value, ⅔. To show this, Equation (4) is iterated one more time and linearize it again but this time around $f(f(x(0)))$, and the result is:

$$x_j(2) = \frac{1}{3}f(f(x(0)) + p + D\delta_j(1)) + \quad (8)$$
$$\frac{1}{3}[f(f(x(0)) + p + D\delta_{j-1}(1)) + f(f(x(0)) + p + D\delta_{j+1}(1))]$$

where $$p = \frac{1}{3}Df'(x(0))[\delta_j(0) + \delta_{j-1}(0) + \delta_{j+1}(0)]].$$

By linearizing Equations (8) around $f(x(0))$:

$$x_j(2) = f(f(x(0))) + f'(f(x(0))) + \quad (9)$$
$$f'\left(f(x(0))p + \frac{1}{3}f'(f(x(0))[\delta_j(0) + \delta_{j-1}(0) + \delta_{j+1}(0)]\right)$$

Again it is observed that the noise terms that were added at the previous step, are averaged out by the coupled dynamical system 50. The distribution of noise effects after two iterations can be:

$$N\left(0, \frac{1}{3}D^2[(f'(f(x(0))))^2(f'(x(0)))^2 + (f'(f(x(0)))^2]\right) \quad (10)$$

This is a general rule and the same averaging phenomenon can repeat over the next iterations of the map as well.

In general, the distribution of noise effects in the coupled dynamical system for chaos computing with coupling size of 3 after m iteration of the map is:

$$N\left(0, \frac{1}{3}D^2[\lambda_m^2\lambda_{m-1}^2\ldots\lambda_2^2\lambda_1^2 + \lambda_m^2\lambda_{m-1}^2\ldots\lambda_2^2\lambda_1^2 + \ldots + \lambda_m^2]\right) \quad (11)$$

where $\lambda_k = f'(f^{k-1}(x_0))$, and $f^{m-1}$ means m−1 iterations of function $f$. Whereas the distribution of noise effects in the single dynamical system for chaos computing is:

$$N(0, D^2[\lambda_m^2\lambda_{m-1}^2\ldots\lambda_2^2\lambda_1^2 + \lambda_m^2\lambda_{m-1}^2\ldots\lambda_2^2\lambda_1^2 + \ldots + \lambda_m^2]) \quad (12)$$

It is observed that in coupled dynamical system for chaos computing, the variance of distribution of noise effects at each iteration is always resealed and shrunk by $$\frac{1}{3}.$$

As a result, no matter what the iteration number is, the coupled dynamical system for chaos computing can tolerate noise intensities of up to $\sqrt{3}$ times size of the noise intensity that a similar single dynamical system for chaos computing can tolerate.

This resealing rule can be stated in a general form for any globally coupled dynamical system as well. In a globally coupled dynamical system of size N, where all nodes all connected to each other as follows:

$$x_j(i+1) = (1-\varepsilon)f(x_j(i)) + \frac{\varepsilon}{N-1}\left[\sum_{i\neq j}f(x_i(i))\right] \quad (13)$$

The maximum amount of noise reliability can occur when $$\varepsilon = \frac{N-1}{N},$$

and as a result the globally coupled dynamical system for chaos computing can tolerate up to $\sqrt{N}$ times size of the noise intensity that a similar single dynamical system for chaos computing can tolerate. This rule can be verified by taking derivate of the variance of the noise evolution in the globally coupled dynamical system and setting it to zero.

Throughout the modeling of noise effects and computing its distribution in Equations (6), (7), and (9)-(12), the noise terms that can add up to the dynamical system have been left out at the current step, and modeling covers the evolution of the noise terms that have been already added to the system during the past steps. The noise term added to the system at the current step and its effects and evolution can be added to the equation in computing the distribution of the noise during the next iteration of the map.

In an embodiment, one humped $f$ map can be considered as:

$$x(n+1) = 1 - 2x^2(n) \quad (14)$$

The dynamics of coupled dynamical system is governed by Equation (1). The reliability of the coupled dynamical system for chaos computing with three single dynamical systems coupled in a ring architecture can be compared with reliability of the single dynamical system for chaos computing where there is just a single map of Equation (14).

Figure 5A:
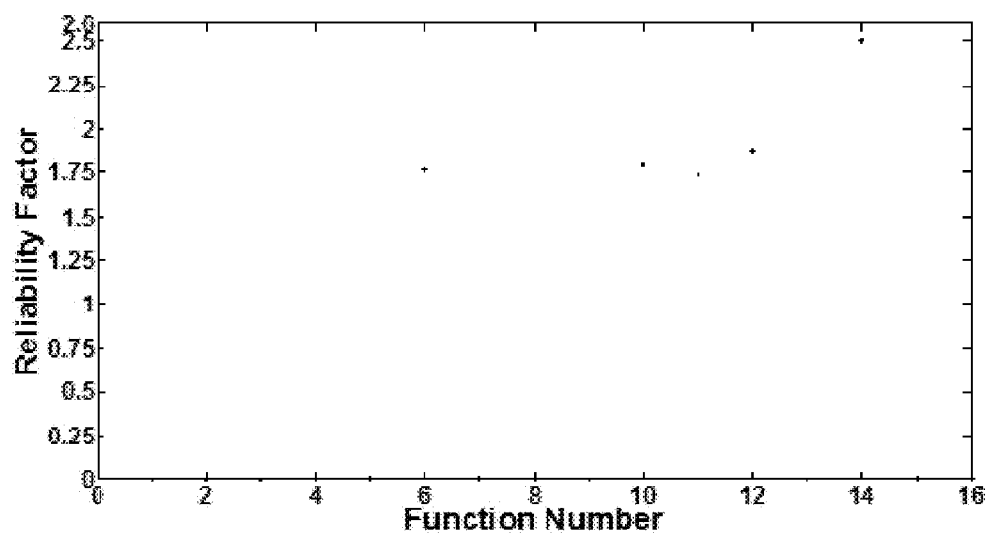
FIGS. 5A-B are graphs illustrating the ratio of reliability for different functions in accordance with an embodiment.
Figure 5B:
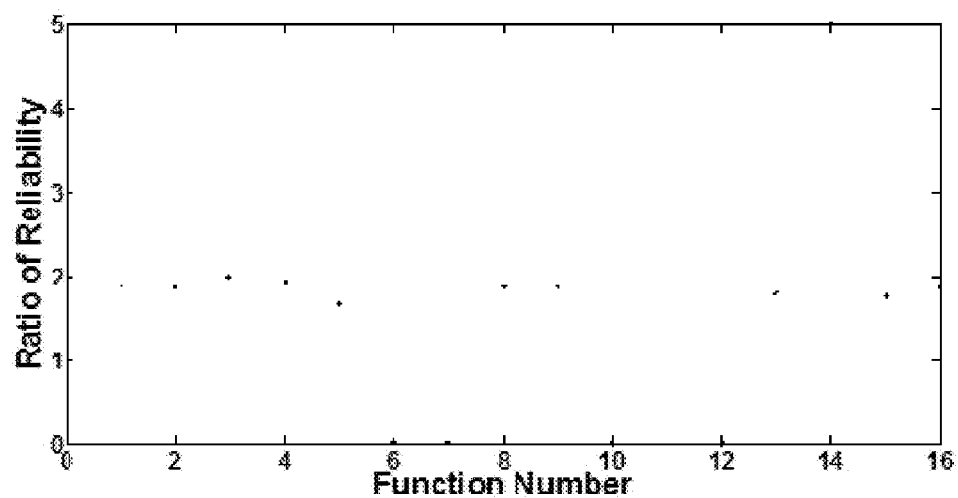

FIGS. 5A and 5B illustrate the ratio of reliability for different functions in accordance with an embodiment of the present invention. The term "reliability factor" is defined as the ratio of the maximum amount of noise intensity that the coupled dynamical system can tolerate compared to the maximum amount of noise intensity that a single dynamical system can tolerate. The ratio of improvements is shown in FIGS.

5A and 5B in terms of maximum amount of noise intensity that the commuting system can tolerate. There are 16 different two inputs, one output, and digital combinational functions, and they are labeled by numbers 1 to 16 based on their outputs. For example, a digital function with all 0 output is function number 0, and the function with all 1 output is function number 16. Functions are the horizontal axis, and the dots represent the ratio of improvement of reliability for each function. FIG. 5A illustrates the ratio of improvements when the iteration number of dynamic map is 3, and FIG. 5B illustrates the results when the iteration number is five. It is observed that the ratio of improvement is around $\sqrt{3}$.

Still referring to FIGS. 5A and 5B, all of 16 digital functions may not be performed by the computing system. However, at 5 iterations, it can perform more number of functions that it can perform at 3 iterations. The functions that are not obtainable using the computing system are shown by a dot on the x axis. As a result, a dot on x axis does not imply 0 times improvement, rather it means that this specific function is not obtainable.

In another embodiment, an array of coupled dynamical systems can be programmed to implement more than a single gate. The epsilon value that is the coupling parameter needs to be set to a relatively small value, allowing different nodes of the array to operate more independently, and as a result build different functions.

In an embodiment, each cell of the array can be used to implement a different digital function than the other cells. For example, a half adder using an array of size two can be built. Each cell of this coupled dynamical system can be initialized with the same data inputs but different control inputs in order to build different functions. One cell of the array can build a 2 input XOR gate producing sum and another cell of the array can build a 2 input and gate producing carry out.

The effects of coupling on robustness against the functions can be investigated by changing the coupling between these two cells. It is observed that couplings higher than 0.25 in the coupled dynamical system may not perform the needed functions. Without being bound by any particular theory of operation, it is believed that with coupling parameters of 0.25 and higher, a synchrony may appear between the cells, and both nodes may behave the same and build the same type of function. This feature can be very useful if a single, but very robust, type of function is to be built using the entire array. However, for building separate and different functions, the coupling parameter needs to be low, thereby enabling the nearby nodes to behave differently and build different types of functions.

Figure 6:
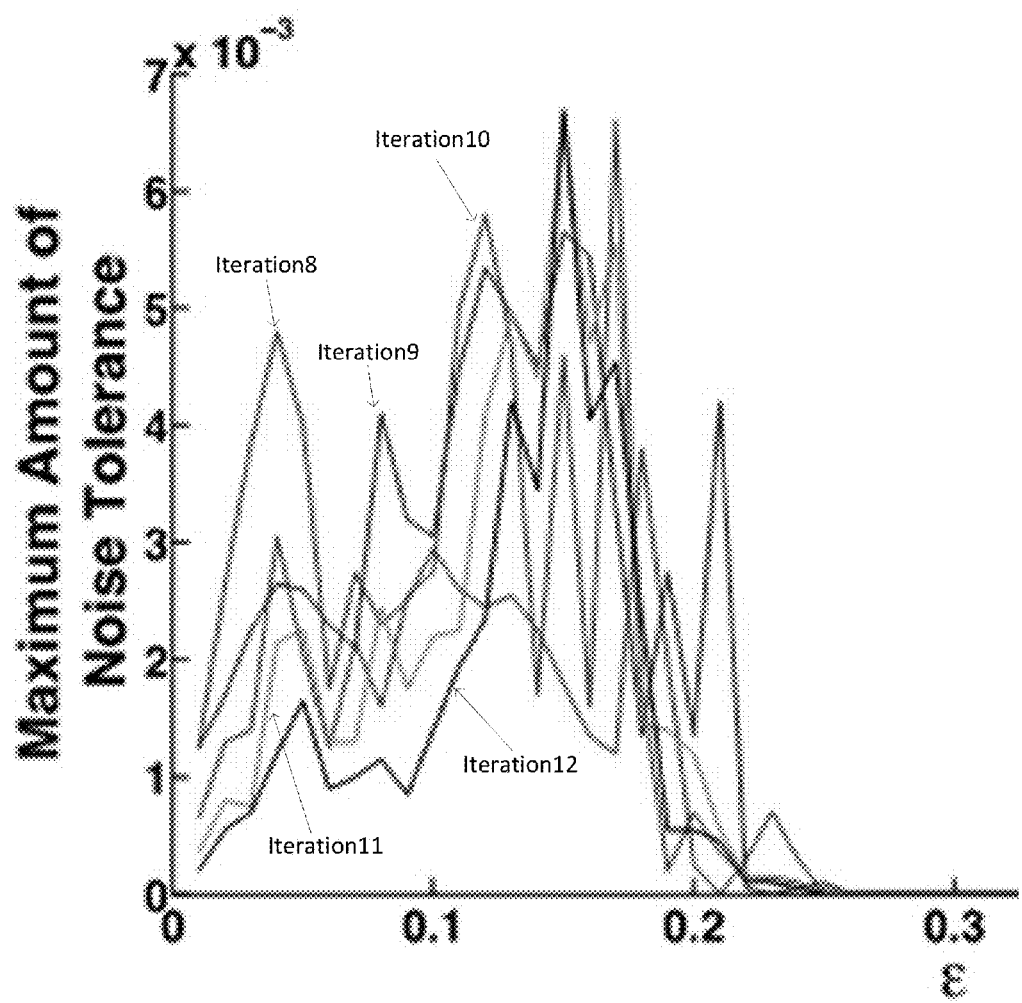
FIG. 6 is a graph illustrating maximum amount of noise tolerance of the half adder in terms of the noise intensity D plotted for different values of coupling parameters in accordance with an embodiment.

FIG. 6 illustrates maximum amount of noise tolerance of the half adder in terms of the noise intensity D plotted for different values of coupling parameters in accordance with an embodiment of the present invention. The robustness of coupled dynamical system in different iterations of Equation (1) for different couplings is plotted in FIG. 6. It is noted that the robustness is defined as the maximum noise intensity, D, that can be tolerated by both cells without disruption of the computation. As shown in FIG. 6, the higher the maximum amount of noise tolerance, the more robust the half adder is. It is also observed that with an increase of epsilon value, the robustness may increase until a point that it starts to decrease and at epsilon value of 0.25 or higher, the array of dynamical systems may fail to build the half adder.

As described above, by changing and tuning the coupling parameter, different nodes can perform different functionalities in parallel at the same time, or the whole array can be tuned to build a single, but very robust, function. The former case is called the "high performance mode" while the latter mode is called the "robust mode." This means that the same coupled dynamical system can be programmed to operate at "high performance" mode, or at "robust mode."

Systems and applications that are exposed to different environmental conditions can be programmed to operate at high performance mode or robust mode. For example, when an aerospace system is exposed to high noise radiations, the coupled dynamical system can be programmed to operate at a "robust mode", which enables the computing system operate at higher noise immunity levels at the expense of a small of reduction in functionality of the dynamic computing system. When the noise level returns to a normal and low level, the coupled dynamical system can be reprogramed to operate at a "high performance" mode. With the coupled dynamical system, a computing system can implement adjustable noise immunity level that can be programmed based on the operating condition of the computing system.

Figure 7A:
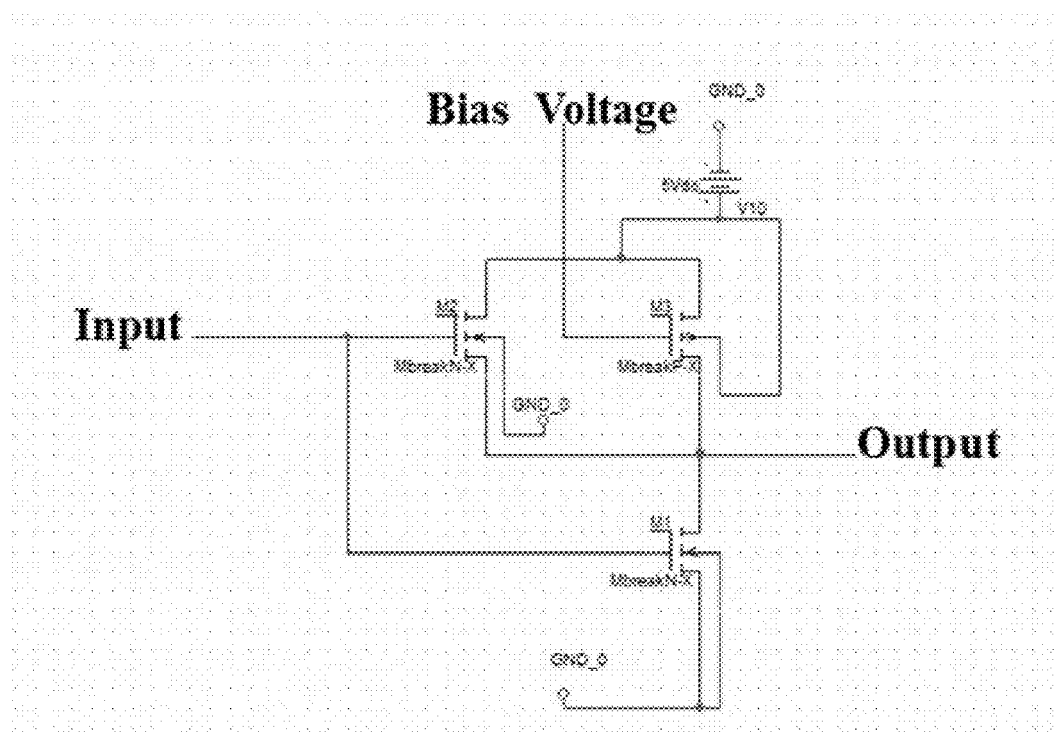
FIG. 7A is a circuit diagram illustrating a three-transistor implementation of an individual dynamical system in accordance with an embodiment.
Figure 7B:
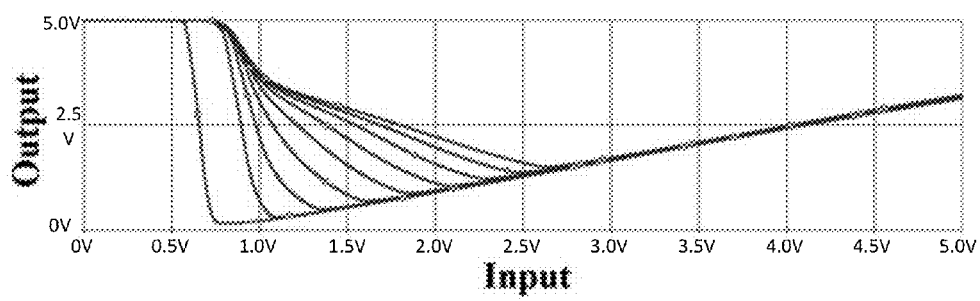
FIG. 7B is a graph illustrating output of the individual dynamical system in FIG. 7A that is plotted against different input values in accordance with an embodiment.

FIG. 7A illustrates a three-transistor implementation of an individual dynamical system mapping inputs to outputs in accordance with an embodiment of the present invention. FIG. 7B illustrates output of the individual dynamical system in FIG. 7A that is plotted against different input values in accordance with an embodiment of the present invention. To design the circuits, 0.6 μm CMOS technology and On-Semi C5 process are used in FIG. 7A. The chaotic map $f$ of the individual dynamical system can be any map, and can have any implementation. For example, a simple 1-D map that can be easily implemented using three transistors is used as shown in FIG. 7A. The values of the transistors can be as follows: $M_1$=8 μm/0.6 μm, $M_2$=80 μm/0.6 μm, and $M_3$=8 μm/0.6 μm. The output of the map for different input values is plotted in FIG. 7B for different values of bias voltage.

For analog switches, a simple n-mos transistor, which is normally called an n-mos transmission gate, or simply pass transistor, may suffice. A CMOS transmission gate may also be used. The CMOS transmission gage consists of an n-mos and p-mos coupled together, but a simple n-mos transmission gate can be enough. However, in the case of using a simple n-mos transmission gate, the voltage level of the transmitted signals needs to be less than the voltage level of the clock signal that drives the n m-mos gate, and the difference in voltage level needs to be at least with of the transistor. This is basically a trade-off between voltage levels or the number of transistors, A circuit with fewer transistors may require a higher voltage level for clocking, but a larger circuit may require one voltage level for the entire circuit. In the circuit shown in FIG. 7A, single transistor transmission gates and 7-volt clocks are used. The values of n-mos transistors used as transmission gates are W/L=2 μm/0.6 μm.

Figure 8:
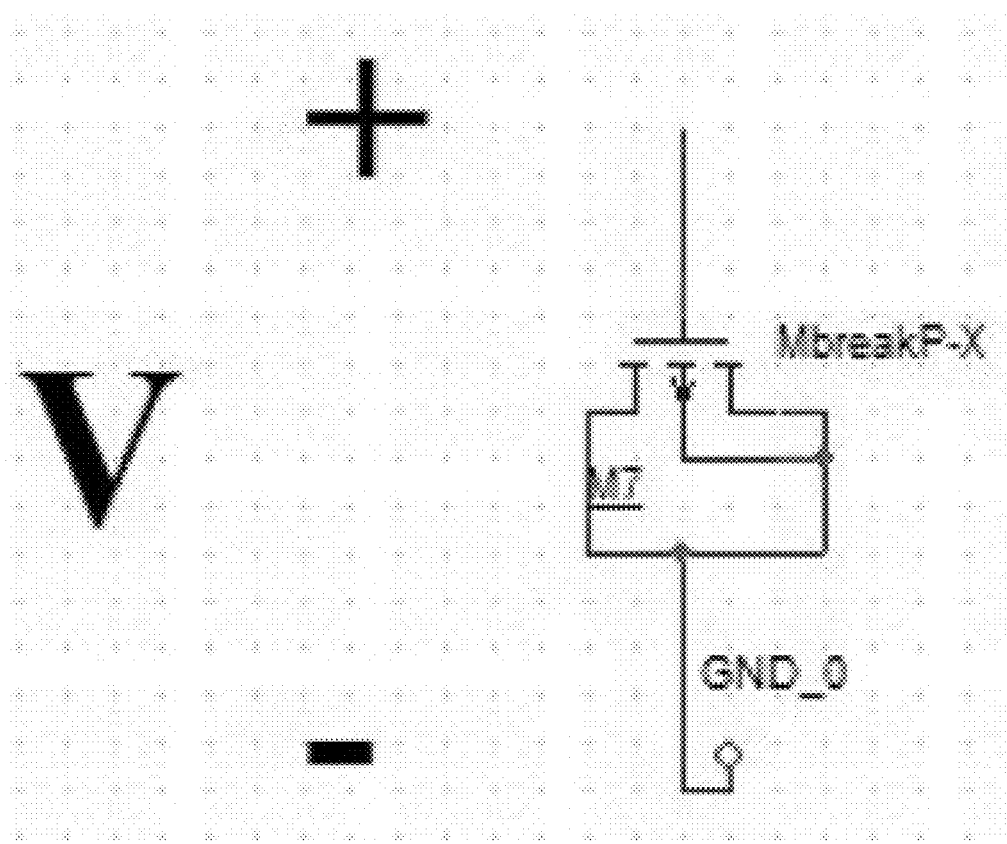
FIG. 8 is a circuit diagram illustrating a p-mos transistor operating as a capacitor in accordance with an embodiment.

Input capacitance of transistors of the chaotic map can be used to temporarily store the input. In the circuit design in FIG. 7A, because a very high precision in sampling and holding is needed, in addition to this capacitance element, an extra p-mos transistor that is biased to operate as a capacitor is used. FIG. 8 further illustrates the extra p-mos transistor operating as a capacitor. Drain, source, and body of this p-mos transistor are all grounded, and the gate terminal is used as the capacitor. The size of this p-mos transistor is W/L=40 μm/80 μm.

Circuits for the coupled dynamical system can be implemented by any diffusive coupling between states of the circuits. For example, the attached circuit implementation for each single chaotic dynamical system is of order 1. This means that a first order difference equation models the chaotic map. The state variable can be stored in the capacitor as shown in FIG. 8. By diffusive coupling of the capacitors of different circuits, the different circuits can be coupled together. More specifically, a simple resistor running between two capacitors can dynamically couple them together.

Figure 9:
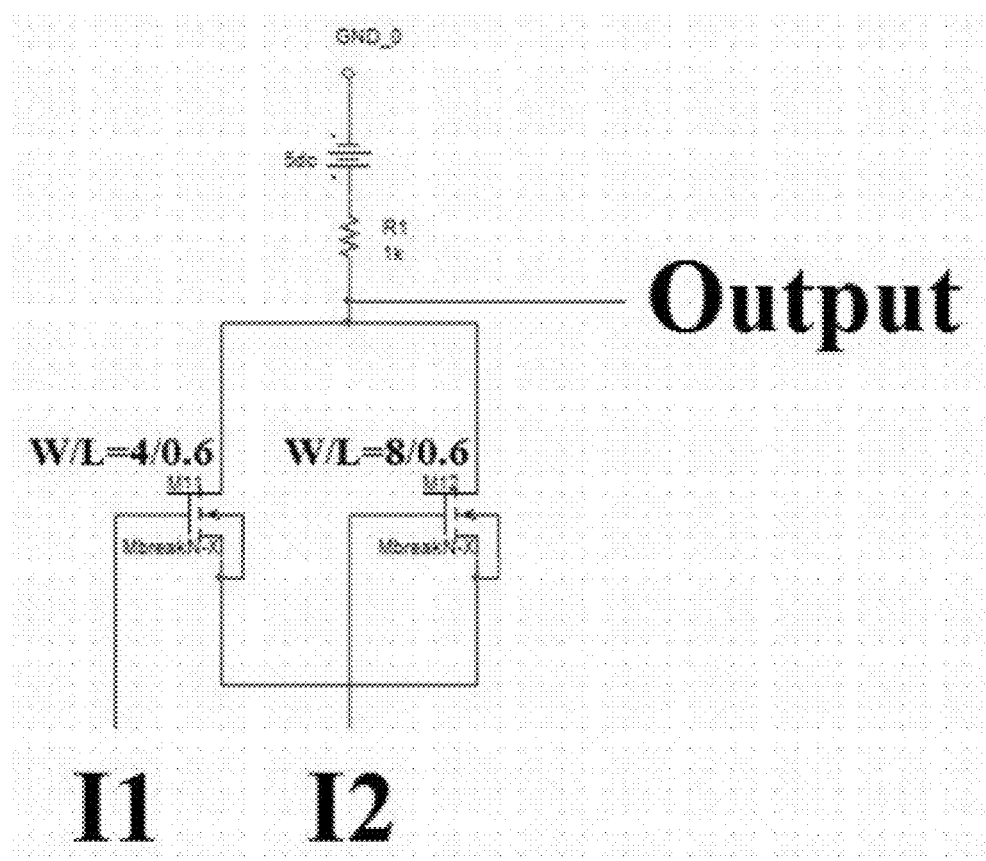
FIG. 9 is a circuit diagram illustrating an encoding circuit for mapping binary data inputs to an analog output value in accordance with an embodiment.

FIG. 9 illustrates an encoding circuit for mapping binary data inputs to an analog output value. The encoding circuit can map two binary inputs to a voltage value. Two lower transistors shown in FIG. 9 can be turned on or off based on the value of the binary input. The two lower transistors may have different W/L ratios; as a result (1,0) and (0,1) inputs can produce different output voltage.

The encoding circuit does not need to be an exact, perfect digital to analog convertor; any map that maps different data inputs to unique and distinct values (with enough distance between the produced values) can be used to encode the input data as the initial condition of the chaotic map. The dynamic circuit can take care of the rest. These distinct initial conditions under the chaotic dynamics may produce distinct and different orbits that results in different outputs.

Figure 10A:
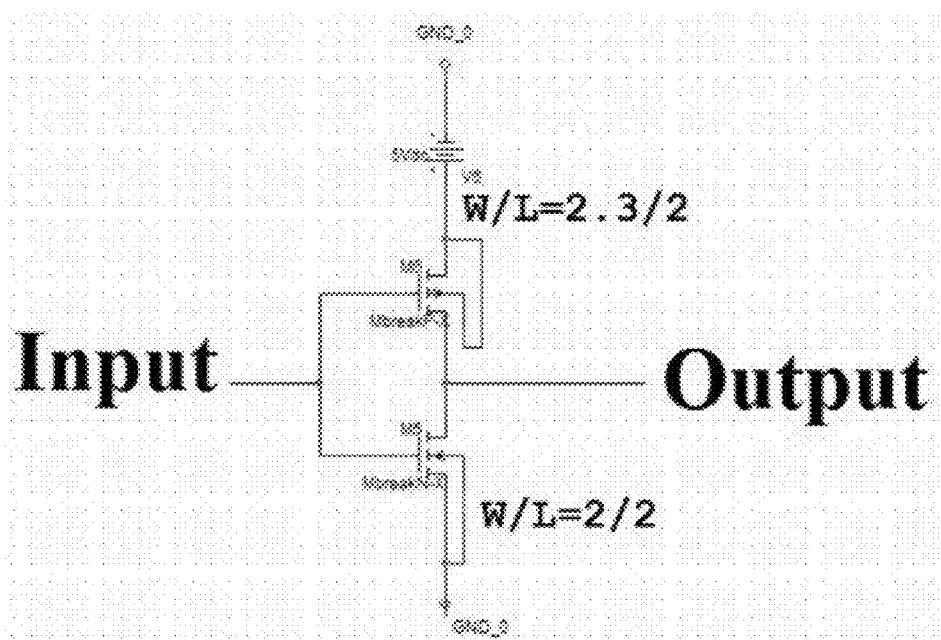
FIG. 10A is a circuit diagram illustrating a decoding circuit that is used to produce binary output from an analog input in accordance with an embodiment.
Figure 10B:
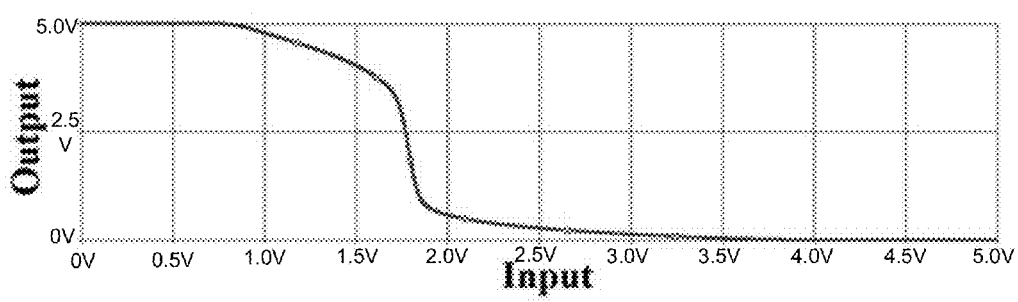
FIG. 10B is a graph illustrating output of the decoding circuit in FIG. 10A that is plotted versus different input values in accordance with an embodiment.

FIG. 10A illustrates a simple inverter (or decoding) circuit that is used to produce binary output from an analog input in accordance with an embodiment of the present invention. To assign a symbol to the output state of a map, the state space of the map can be divided into two parts, and each part is assigned a symbol 0, or 1. The output production circuit or decoding circuit is supposed to produce symbol 0 or 1, based on at which part the output of the map is located. The simple inverter circuit does this function as a decoding circuit. A two-transistor inverter circuit is shown in FIG. 10A, and its output for different input values is plotted in FIG. 10B. In FIG. 10B, the circuit maps the inputs values that are in the lower half of the interval, to 5, which represents logic 1, and the upper half to 0, logic 0. In the middle of the input interval, around 2.5, the output transists from 1 to 0, and it does not produce symbol 0 or 1. In general, in chaos computing orbits that get too close to the boundaries is not used, here 2.5, because 1) it is not very robust against noise, 2) the output symbol may not be a clean 0 or 1 symbol.

This circuit can assign symbol "1" for input values in [0,1.8) and symbol "0" for input values in (1.8, $V_{dd}$]. There are two reasons that 1.8 is chosen as the threshold value for production of the output symbol. The first reason is mostly dynamically oriented. The critical point of the maps is normally preferred to use as the threshold value. As shown in FIG. 7B, this critical value can depend on the bias voltage of the circuit. The 1.8 is about the average of different critical values of the maps for different bias values. The second reason is that the threshold value should be chosen so that the probability of obtaining 0 and 1 as the outputs becomes equal. In other words, the orbits of the chaotic system can spend the same amount of time at each side of the threshold value. This insures that the implemented logic block can implement all digital functions efficiently and it is not biased to implement functions that produce just 1s or 0s.

Figure 11A:
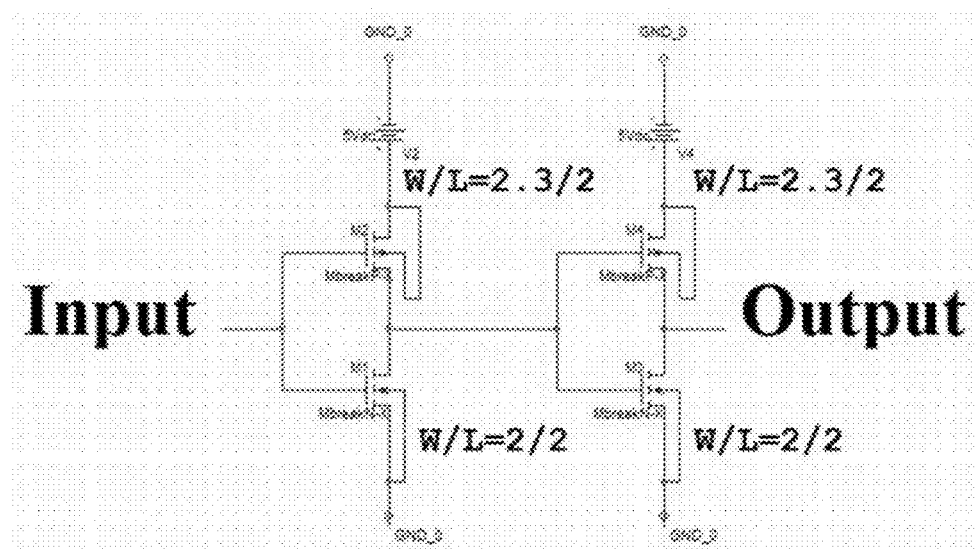
FIG. 11A is a circuit diagram illustrating two cascaded inverter circuits that is to produce an enhanced binary output from an analog input in accordance with an embodiment.
Figure 11B:
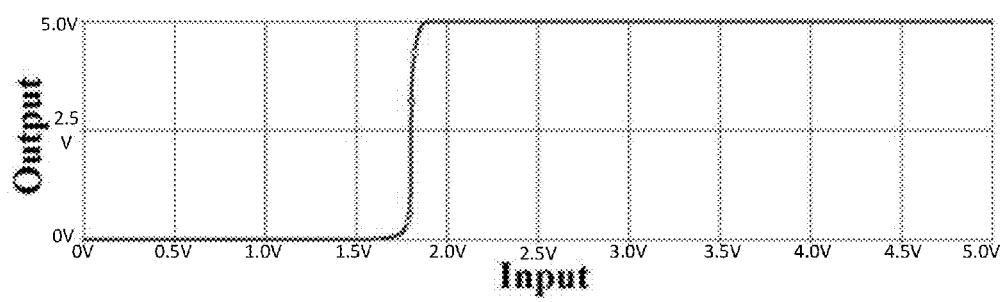
FIG. 11B is a graph illustrating output of the cascaded inverter circuit in FIG. 11A that is plotted versus different input values in accordance with an embodiment.

At 1.8, the output can transist from 1 to 0, and the circuit may not produce a clean symbol 0 or 1. In general, in chaos computing, orbits that get too close to the boundaries, such as 1.8, are not used because: (1) it is not very robust against noise; and (2) the output symbol may not be a clean 0 or 1 symbol. As a result, the circuit shown in FIG. 9 can be sufficient for this application. However, two cascaded inverters can be used to overcome this situation. FIG. 11A illustrates the two cascaded inverter circuits to produce an enhanced binary output from an analog input in accordance with an embodiment of the present invention. FIG. 11B illustrates output of the cascaded inverter circuit in FIG. 11A that is plotted versus different input values in accordance with an embodiment of the present invention. In FIG. 11B, the circuit maps the inputs values that are in the lower half of the interval, to 0, which represents logic 0, and the upper half to 5, logic 1. As shown in FIG. 11B, the circuit has an enhanced performance and transmission at the threshold value, 2.5V. It is noted that the circuit assigns symbol 0 to [0,1.8) and symbol "1" for input values in (1.8, $V_{dd}$].

Figure 12:
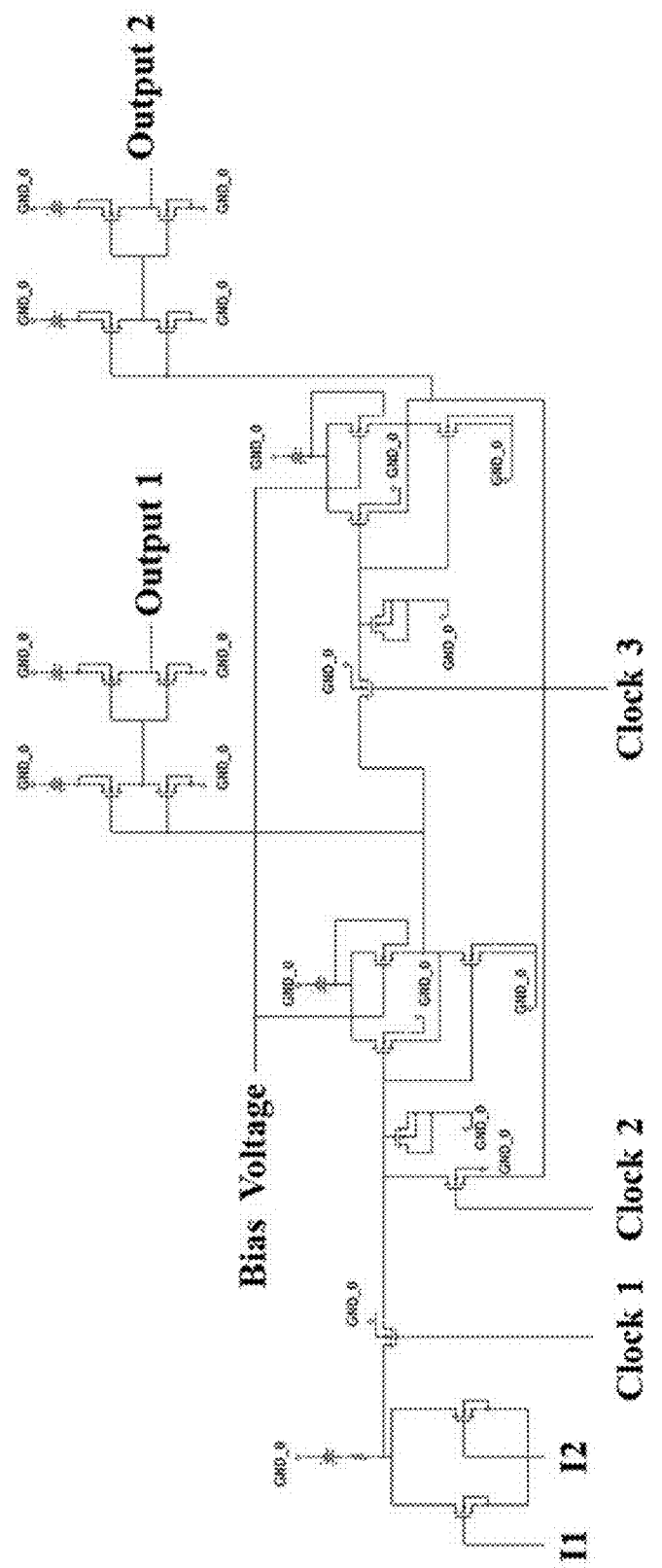
FIG. 12 is a circuit diagram illustrating chaos based logic design which is composed of the circuits illustrated in FIGS. 7-11 in accordance with an embodiment of the present invention.

FIG. 12 illustrates an individual dynamical system based logic design that is composed of the circuits illustrated in FIGS. 7-11 in accordance with an embodiment of the present invention. The circuit is composed of the sub-circuits. Different combinations of data inputs can initialize the first chaotic map to different values, and then from there the chained chaotic maps evolve. This circuit can implement a two-input, one-output digital function. However, it can be programmed to implement different functions, too.

While the coupled dynamical system for chaos computing has been described in connection with the various embodiments of the various figures, it is to be understood that other similar embodiments may be used or modifications and additions may be made to the described embodiments of the coupled dynamical system without deviating therefrom. For example, one skilled in the art will recognize that the coupled dynamical system for chaos computing as described in the instant application may apply to any electrical device such as circuits, registers, capacitors, inductors, transistors, or the like. Therefore, the coupled dynamical system for chaos computing should not be limited to any single embodiment, but rather should be constructed in breadth and scope in accordance with the appended claims.

What is claimed:

1. A coupled dynamical system for chaos computing, comprising:
    a first circuit comprising a plurality of single dynamical systems to form a coupled dynamical system that reduces local noises in the plurality of single dynamical systems by diffusing the local noises across the coupled dynamical system;
    a second circuit, operatively coupled to the first circuit, that receives data inputs and control inputs and builds an encoding map, the encoding map translating the data and control inputs to an initial condition on an unstable manifold of the plurality of single dynamical systems in the coupled dynamical system; and
    a third circuit, operatively coupled to the first circuit, that builds a decoding map and samples a state of one of the plurality of single dynamical systems in the coupled dynamical system after the coupled dynamical system evolves for a fixed time.

2. The system of claim 1, the first circuit comprises at least one of registers, capacitors, inductors, or transistors.

3. The system of claim 1, wherein the coupled dynamical system is represented by a coupled map lattice as a subgroup of the coupled dynamical system, the coupled map lattice having a plurality of nodes being indicative of additive noise in each of the plurality of single dynamical systems.

4. The system of claim 1, wherein arrangements of the plurality of the single dynamical systems in the coupled dynamical system comprises at least one topology of a point-to-point, a star, a ring, a mesh, a tree, a line, a fully connected, or any combination thereof.

5. The system of claim 1, the local noises in the plurality of single dynamical systems comprise additive noise, multiplicative noise, quantization error, Poisson noise, shot noise, transient noise, burst noise, and phase noise.

6. The system of claim 1, wherein the coupled dynamical system is initialized to an initial condition based on the encoding map.

7. The system of claim 1, wherein the encoding map translates the data and control inputs to at least one parameter of the plurality of single dynamical systems in the coupled dynamical system, thereby performing desired computation by the coupled dynamical system.

8. The system of claim 1, wherein a noise robustness of the coupled dynamical system increases as a size of the coupled dynamical system increases.

9. The system of claim 1, wherein the coupled dynamical system evolves for a fixed time if the coupled dynamical system is continuous.

10. The system of claim 1, wherein the coupled dynamical system evolves for a fixed iteration if the coupled dynamical system is discrete.

11. The system of claim 1, wherein the third circuit generates an output of computation based on the decoding map.

12. The system of claim 10, wherein the output of computation varies with changes of the control inputs.

13. A method comprising:
fabricating a first circuit comprising a plurality of single dynamical systems to form a coupled dynamical system that reduces local noises in the plurality of single dynamical systems by diffusing the local noises across the coupled dynamical system;
fabricating a second circuit, operatively coupled to the first circuit, that receives data inputs and control inputs and builds an encoding map, the encoding map translating the data and control inputs to an initial condition on an unstable manifold of the plurality of single dynamical systems in the coupled dynamical system; and
fabricating a third circuit, operatively coupled to the first circuit, that builds a decoding map and samples a state of one of the plurality of single dynamical systems in the coupled dynamical system after the couple dynamical system evolves for a fixed time.

14. The method of claim 13, the first circuit comprises at least one of registers, capacitors, inductors, or transistors.

15. The method of claim 13, wherein the coupled dynamical system is represented by a coupled map lattice as a subgroup of the coupled dynamical system, the coupled map lattice having a plurality of nodes being indicative of additive noise in each of the plurality of single dynamical systems.

16. The method of claim 13, wherein arrangements of the plurality of the single dynamical systems in the coupled dynamical system comprises at least one of a point-to-point, a star, a ring, a mesh, a tree, a line, or a fully connected.

17. The method of claim 13, the local noises in the plurality of single dynamical systems comprise additive noise, multiplicative noise, quantization error, Poisson noise, shot noise, transient noise, burst noise, and phase noise.

18. The method of claim 13, further comprising initializing, based on the encoding map, the coupled dynamical system to an initial condition.

19. The method of claim 13, wherein the encoding map translates the data and control inputs to at least one parameter of the plurality of single dynamical systems in the coupled dynamical system, thereby performing desired computation by the coupled dynamical system.

20. The method of claim 13, wherein a noise robustness of the coupled dynamical system increases as a size of the coupled dynamical system increases.

21. The method of claim 13, wherein the coupled dynamical system evolves for a fixed time if the coupled dynamical system is continuous.

22. The method of claim 3, wherein the coupled dynamical system evolves for a fixed iteration if the coupled dynamical system is discrete.

23. The method of claim 13, further comprising generating, by the third circuit, an output of computation based on the decoding map.

24. The method of claim 23, wherein the output of computation varies with changes of the control inputs.

25. A method for operating a coupled dynamical system for chaos computing, comprising:
diffusing local noises across a coupled dynamical system, the coupled dynamical system comprising a first circuit comprising a plurality of single dynamical systems that reduces local noises in the plurality of single dynamical systems;
operatively coupling a second circuit to the first circuit, the second circuit receiving at least one input to build an encoding map, the encoding map translating the at least one input to at least one parameter on an unstable manifold of the plurality of single dynamical systems in the coupled dynamical system; and
operatively coupling a third circuit to the first circuit, the third circuit building a decoding map and sampling a state of one of the plurality of single dynamical systems in the coupled dynamical system after the coupled dynamical system evolves for a fixed time.

26. The method of claim 25, wherein the at least one input comprises data inputs and control inputs.

27. The method of claim 25, wherein the encoding map translates the at least one input to an initial condition on the unstable manifold of the plurality of single dynamical systems in the coupled dynamical system.

* * * * *